(12) United States Patent
Gassman

(10) Patent No.: US 7,070,132 B1
(45) Date of Patent: Jul. 4, 2006

(54) LOW-SPEED HIGH-TORQUE CHIPPER-SHREDDER MACHINE

(75) Inventor: Max P. Gassman, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 151 days.

(21) Appl. No.: 10/645,361

(22) Filed: Aug. 21, 2003

(51) Int. Cl.
*B02C 4/12* (2006.01)

(52) U.S. Cl. .......................................... 241/28; 241/242
(58) Field of Classification Search ................... 241/28, 241/30, 101.78, 166, 243, 242
See application file for complete search history.

(56) References Cited

U.S. PATENT DOCUMENTS

| | | | | |
|---|---|---|---|---|
| 2,130,457 | A | * | 9/1938 | Fickett et al. ................ 144/176 |
| 4,632,319 | A | | 12/1986 | Schlund et al. |
| 5,052,630 | A | * | 10/1991 | Hinsey et al. ................. 241/36 |
| 5,137,219 | A | * | 8/1992 | Morey .......................... 241/92 |
| 5,226,607 | A | * | 7/1993 | Karg ........................... 241/166 |
| 5,603,459 | A | | 2/1997 | Gearing et al. |
| 6,659,378 | B1 | * | 12/2003 | Di Anna ....................... 241/73 |
| 6,824,089 | B1 | * | 11/2004 | Gross et al. ............. 241/261.1 |

* cited by examiner

*Primary Examiner*—Mark Rosenbaum
(74) *Attorney, Agent, or Firm*—McKee, Voorhees & Sease, P.L.C.

(57) ABSTRACT

A yard waste chipper-shredder machine includes a reversible electric motor to drive a roller at low speed and high torque. The waste material is fed into an inlet chute and is crushed and ground into mulch between the roller and the chute for discharge through an outlet chute. The chute is spring biased to reduce jams. The machine operates quietly. Jams are quickly and easily removed by reversing the motor.

23 Claims, 2 Drawing Sheets

LOW-SPEED HIGH-TORQUE CHIPPER-SHREDDER MACHINE

BACKGROUND OF THE INVENTION

Chipper and shredder machines are well known for reducing yard waste, such as tree branches, leaves and other vegetation, into mulch. Such yard waste material is banned from landfills in many towns and cities. One alternative is composting, which works well for leaves and grass clippings, but does not work well for small limbs and branches. A chipper-shredder machine can reduce small limbs to a size that is easier to handle and which is suitable for composting. The shredded material can also be used for ground cover so as to reduce moisture loss and weed growth, and add aesthetics to a landscaped lawn.

Conventional chipper-shredder machines are normally powered by a 4–18 horsepower gasoline engine, or an electric motor for smaller units. The engines rotate knives or blades at high speed to cut and smash the limbs, branches, and other yard waste material into smaller mulch. In residential neighborhoods, the loud noise generated by gasoline powered machines is undesirable. The smaller electric powered machines are not suitable for materials other than leaves and very small twigs.

Prior art chipper-shredder machines also do not function well unless the yard waste materials are dry. Moist and wet materials and green limbs may cause jamming, which requires the machine to be shut down. Since the rotating knives or blades are enclosed, a jam may require partial disassembly of the machine to remove the jam.

Accordingly, a primary objective of the present invention is the provision of an improved chipper-shredder machine.

Another objective of the present invention is the provision of a low speed, high torque chipper-shredder machine.

Another objective of the present invention is the provision of an electrically powered chipper-shredder machine which will efficiently and effectively reduce limbs and branches to mulch.

Another objective of the present invention is the provision of a chipper-shredder machine which uses a roller to crush yard waste material, rather than rotating knives or blades or impact hammers to cut the material.

A further objective of the present invention is the provision a chipper-shredder machine with a reversible motor which facilitates the removal of jammed material.

Still another objective of the present invention is the provision of a chipper-shredder machine having a spring loaded chute to minimize or eliminate jams.

A further objective of the present invention is the provision of an improved chipper-shredder machine which is economical to manufacture and durable and safe in use.

These and other objectives will become apparent from the following description of the invention.

BRIEF SUMMARY OF THE INVENTION

The yard waste chipper-shredder machine of the present invention reduces yard waste materials to mulch with a low speed, high torque roller driven by reversible electric motor. The roller crushes and grinds yard waste material fed through a chute without the use of high speed knives or blades. The chute is biased towards the roller by springs which allow resilient movement of the chute to preclude jams. If a jam occurs, the motor can be reversed so as to easily remove the jam without disassembling any components of the machine.

The method of reducing yard waste material into mulch according to the present invention involves the steps of feeding the material into a chute, crushing and grinding the material with a rotating roller, and discharging the crushed material. In this method, the roller is operated at low speed and high torque so as to mulch the material without using high speed cutting and impact blades.

DETAILED DESCRIPTION OF THE PREFERRED EMBODIMENT

Figure 1:
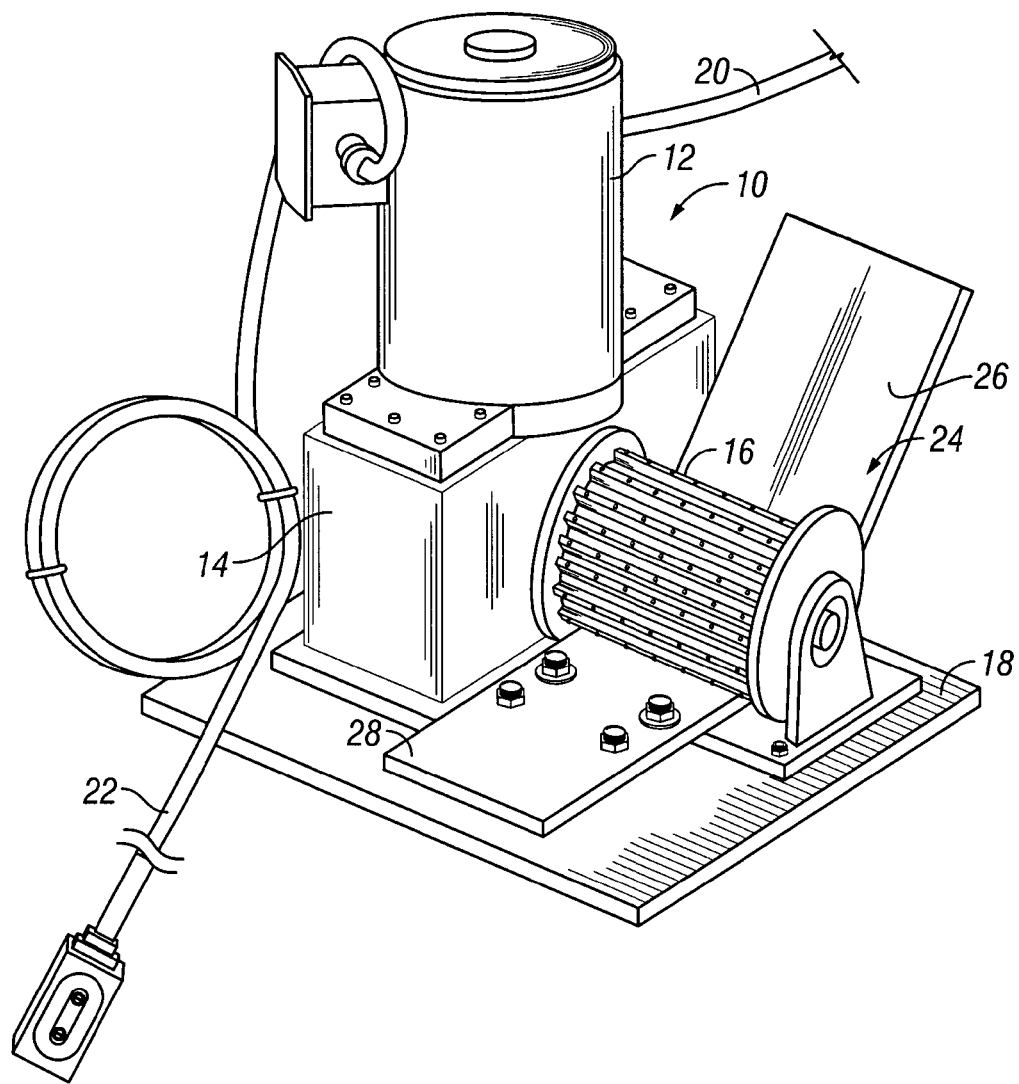
FIG. 1 is a perspective view of the chipper-shredder machine of the present invention.
Figure 2:
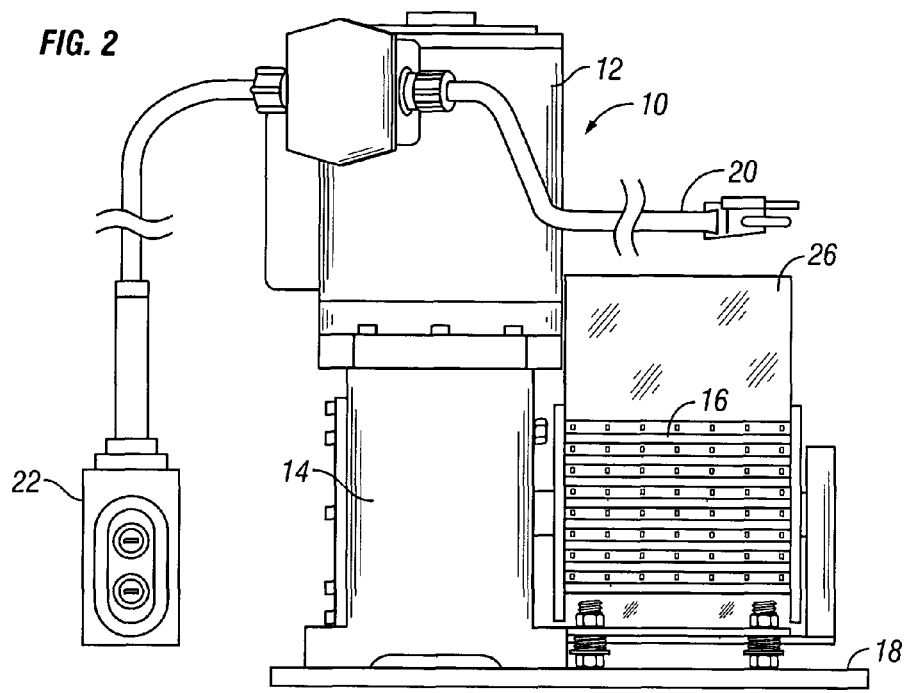
FIG. 2 is a front elevation view of the machine.
Figure 3:
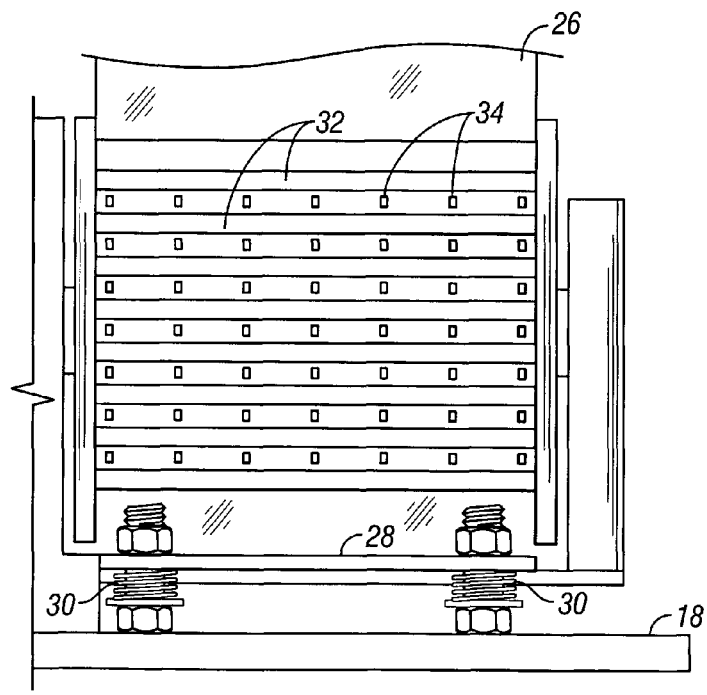
FIG. 3 is an enlarged perspective view of the roller of the machine.

The yard waste chipper-shredder machine as an invention is generally designated by the reference numeral 10 in the drawings. The machine includes a reversible electric motor 12, a speed reducer assembly 14, and a roller 16, all of which are mounted upon a base plate 18. The motor 12 includes an output shaft (not shown) operatively connected to a series of gears (not shown) in the speed reducer assembly 14, so as to drive the roller 16 at a slower speed than the motor speed. A power cable 20 provides power to the motor 12, whose direction of rotation is controlled by a switch 22.

Preferably, the roller 16 is driven at a speed of approximately 60 rpm with a torque of 2000 lb-in. Preferably, the motor 12 operates on 110 volts and has 1 to 2 horsepower.

The machine 10 includes a feed chute 24 having an inlet end 26 for directing yard waste material into the roller 16 and an outlet end 28 for discharging mulched material from the roller 16. While the feed chute 24 is shown to be 1-sided, the chute may include opposite sidewalls and may have a top wall. Also, the chute 24 may be continuous from the inlet end 26 to the outlet end 28, or there may be separate inlet and outlet chutes.

The outlet end 28 of the feed chute 24 is spring loaded so as to bias towards the roller 16. More particularly, springs 30 are provided between the outlet chute 28 and the base plate 18. The springs 30 allow the outlet chute 28 to deflect downwardly towards the base plate 18 in the event that yard waste material is not crushed or broken up by the roller 16, thereby preventing jamming or binding of the roller 16. If a jam occurs, the motor 12 can be reversed to rotate the roller 16 in the opposite direction to remove the limb or branch causing the jam.

The roller 16 includes two sets of teeth to facilitate mulching of the waste material. The first set of teeth 32 extend axially around the perimeter of the roller 16 and pull the yard waste material into the roller 16 from the inlet chute 26. The second set of teeth 34 are small projections extending radially from the surface of the roller 16 at spaced intervals to facilitate break-up of the waste material. The combination of the first teeth 32 and second teeth 34 provide for aggressive action on the yard waste material so as to reduce the material to relatively small-sized mulch.

Additional shims or plates may be added on top of the outlet chute 28 so as to reduce the gap between the roller 16 and the chute. Also, the chute 28 may be provided with projections or raised baffles to slow material flow and thereby enhance the mulching action of the roller 16.

In use, the user turns on the motor 12 with the switch 22 so that the roller 16 turns in a first mulching direction. The user then feeds limbs, branches, and other yard waste materials into the inlet end 26 of the feed chute 24 wherein the feeding roller 16 grips the material and pulls it through the feed chute 24. The teeth 32, 34 crush and grind the material between the roller 16 and the feed chute 24 and discharge the mulched material along the outlet end 28. The electric motor 12 operates relatively quietly as compared to a gasoline powered machine. The low speed, high torque of the roller 16 allows for limbs and branches having a 1-inch diameter or more to be easily reduced to mulch. The spring biased outlet end 28 minimizes jamming of the roller 16. The reversible motor 12 allows jams to be easily moved. The duel set of teeth 32, 34 allows dry and wet or green materials to be mulched by the roller 16.

Accordingly, the improved yard material chipper-shredder machine 10 of the present invention accomplishes at least all of the stated objectives.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A chipper-shredder machine for yard waste, comprising:
   a motor;
   a roller operatively driven by the motor;
   an inlet chute to feed yard waste to the roller so as to grind the yard waste into mulch; and
   an outlet chute to receive the mulch from the roller, the outlet chute being spring loaded.

2. The machine of claim 1 wherein the roller includes a plurality of teeth to feed the waste through the roller.

3. The machine of claim 1 wherein the roller has a torque of at least 2000 lb-in.

4. The machine of claim 3 wherein the roller operates at a speed of approximately 60 rpm.

5. The machine of claim 1 further comprising a speed reducer between the motor and the roller.

6. The motor of claim 1 wherein the motor is reversible.

7. The machine of claim 1 wherein the motor is electric.

8. The machine of claim 7 wherein the motor has an output power of approximately 1 to 2 horsepower.

9. The machine of claim 1 wherein the roller has two sets of differently shaped teeth to enhance grinding of the yard waste.

10. A yard material mulching machine comprising:
    a feed chute with opposite inlet and outlet ends, and along which the yard material flows;
    the outlet end being spring loaded so as to reduce jams in the roller;
    a roller adjacent the feed chute; and
    a motor for rotating the roller such that the yard material is crushed between the roller and the feed chute and thereby reduced into mulch.

11. The machine of claim 10 wherein the roller has a torque of at least 2000 lb-in.

12. The machine of claim 11 wherein the roller operates at a speed of approximately 60 rpm.

13. The machine of claim 10 further comprising a speed reducer between the motor and the roller.

14. The machine of claim 10 wherein the motor is reversible.

15. The machine of claim 10 wherein the motor is electrically powered.

16. A method of reducing yard waste material into mulch, comprising:
    feeding the yard waste material into an inlet chute;
    crushing and grinding the yard waste material with a rotating roller; and
    discharging the crushed yard waste material onto a spring loaded outlet chute that receives the crushed yard waste material from the rotating roller and that is biased toward the roller in order to inhibit jams in the roller.

17. The method of claim 16 wherein the roller is operated at low speed and high torque.

18. The method of claim 17 wherein the roller rotates at approximately 60 rpm.

19. The method of claim 17 wherein the roller has a torque of at least 2000 lb-in.

20. The method of claim 16 wherein the material is reduced to mulch without using cutting or impact blades.

21. The method of claim 16 further comprising rotating the roller in a first direction for mulching and rotating the roller in an opposite direction for unclogging a jam.

22. The method of claim 16 further comprising rotating the roller with an electric motor.

23. The method of claim 16 further comprising rotating the roller in opposite directions with a reversible motor.

* * * * *